United States Patent [19]
Zander et al.

[11] Patent Number: 5,136,847
[45] Date of Patent: Aug. 11, 1992

[54] CAP FOR A RESERVOIR OF A MASTER CYLINDER

[75] Inventors: Richard A. Zander, Niles, Mich.; Donald A. Crumb, Granger, Ind.

[73] Assignee: Allied-Signal Inc., Morristown, N.J.

[21] Appl. No.: 722,040

[22] Filed: Jun. 27, 1991

[51] Int. Cl.⁵ ............................................. F15B 7/10
[52] U.S. Cl. ........................................ 60/585; 60/592
[58] Field of Search ............................... 60/585–589, 60/592; 220/DIG. 32, DIG. 33, 203, 303

[56] References Cited

U.S. PATENT DOCUMENTS

| | | | |
|---|---|---|---|
| Re. 31,080 | 11/1982 | Gaiser | 60/589 |
| 4,142,756 | 3/1979 | Henning et al. | 220/DIG. 33 |
| 4,353,479 | 10/1982 | Nakamura et al. | 60/592 |
| 4,445,330 | 5/1984 | Melinat | 60/585 |
| 4,987,740 | 1/1991 | Coleman | 60/586 |
| 5,031,790 | 7/1991 | Keller | 220/DIG. 33 |

FOREIGN PATENT DOCUMENTS 3850 7/1987 PCT Int'l Appl. .................. 60/588

Primary Examiner—Edward K. Look
Assistant Examiner—F. Daniel Lopez
Attorney, Agent, or Firm—Leo H. McCormick, Jr.; Ken C. Decker

[57] ABSTRACT

A cap for a reservoir of a master cylinder having a disc member with a plurality of perpendicular guides located on a fixed radius from the center of the disc member for aligning a cylindrical body secured thereto. The cylindrical body has an annular flange with a tapered peripheral surface thereon extending from an edge of a shoulder formed adjacent the annular flange. A diaphragm has an annular base connected to an apex section by a first conical leg and a center section connected to the apex section by a second conical leg. The diaphragm has a plurality of ribs that engage the disc member when an annular lip is located on a shoulder of the cylindrical body. When inwardly projecting tabs on the annular edge of the disc engage corresponding arcuate projections extending from the cylindrical neck to fix the cap to the reservoir, the tapered peripheral surface on the flange of the cylindrical member engage the first conical leg to provide a radial force which urges the first conical leg into engagement with the cylindrical neck of the reservoir to form the primary sealing for the reservoir while the plurality of ribs are compressed between the disc and and top of the cylindrical neck to from the secondary sealing for the reservoir.

7 Claims, 1 Drawing Sheet

U.S. Patent	Aug. 11, 1992	5,136,847
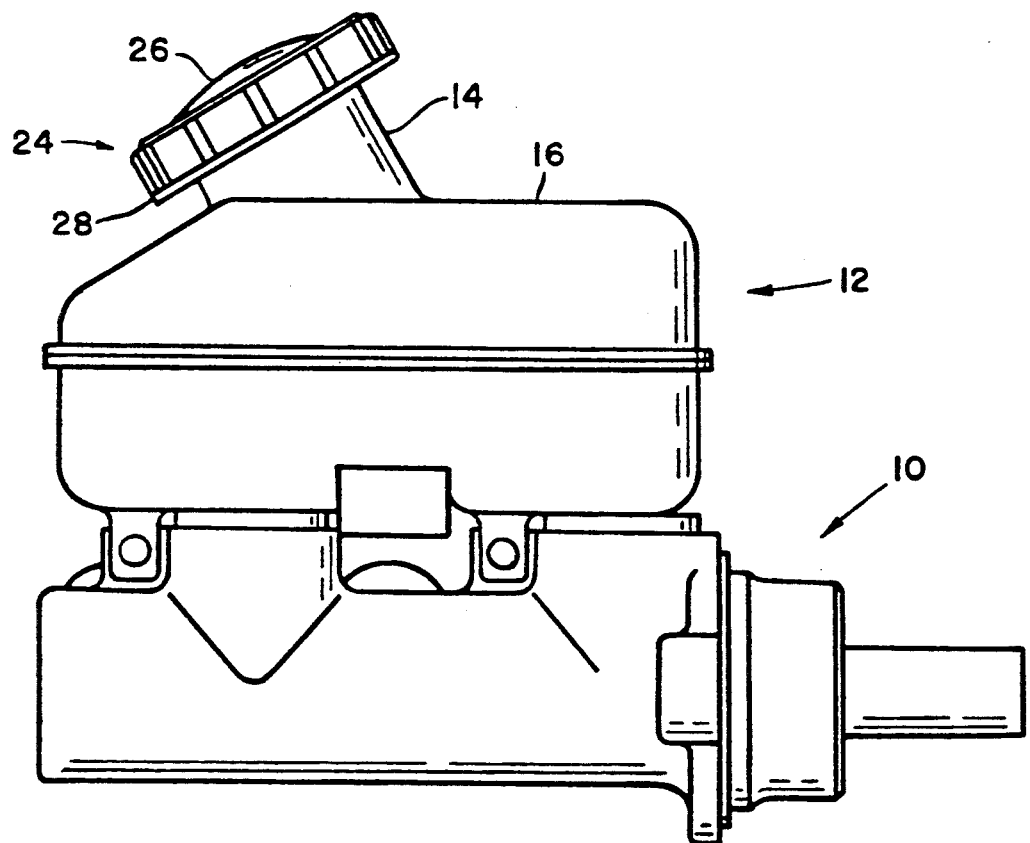
FIG. 1
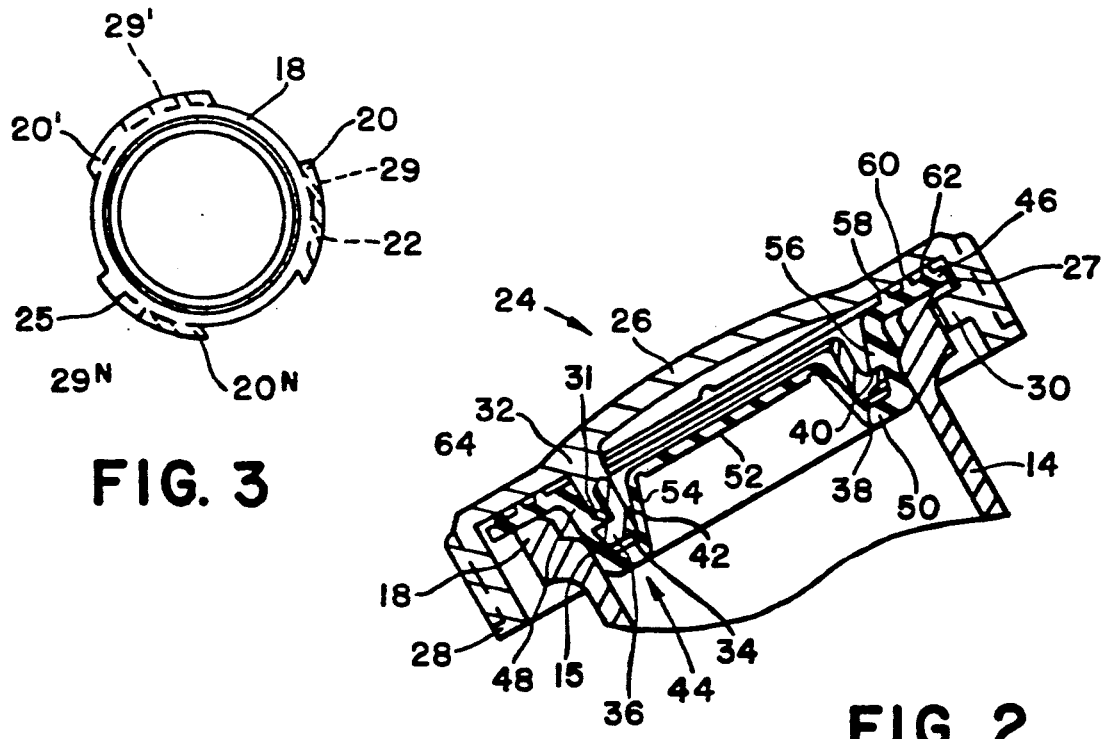
FIG. 3
FIG. 2

CAP FOR A RESERVOIR OF A MASTER CYLINDER

This invention relates to a cap for a reservoir of a master cylinder having a disc member with primary and secondary sealing surfaces to Prevent fluid from being expelled from chambers in the reservoir through the fill opening as a result of thermal expansion and fluid slushing.

Cast master cylinders have reservoir compartments integral with the cylindrical bore in which pistons are moved to pressurize fluid. The reservoir compartments are sealed by a cap of the type illustrated in U.S. Pat. No. 3,818,706 which is held in place by a bail wire. This type master cylinder is adequate for most brake systems. However, in an effort to reduce the overall weight of vehicles, many car manufacturers have replaced cast master cylinders with a combination master cylinder having an aluminum body and a plastic reservoir. Since the aluminum body and plastic reservoir do not normally have the same thermal coefficient, a resilient seal between the components is a primary concern.

U.S. Pat. Nos. 4,658,585 and 4,602,482 are typical plastic reservoirs which have caps attached to the cylindrical fill neck. In this type master cylinders, a seal is compressed between the body of the fill neck and the cap to prevent fluid from being expelled from the compartment of the reservoir. Under most conditions this type of master cylinder structure is adequate, however recently under hood temperatures have increased and as a result some plastic reservoirs have experienced a leak caused by thermal creep between the cap and fill neck. Further the angularity of the fill neck also contributes to the leak problem as the fluid slushing in the reservoir.

We have devised a cap for a master cylinder reservoir having primary and secondary sealing surface for preventing fluid from being expelled from a reservoir when the master is located in a thermal environment. The cap has a disc member with a edge member extending therefrom and a plurality of perpendicular guides located on a fixed radius from the center of the disc member for aligning a cylindrical body secured thereto. The cylindrical body has an annular flange with a tapered peripheral surface thereon extending from an edge of a shoulder formed adjacent the annular flange. A diaphragm has an annular base connected to an apex section by a first conical leg and a center section connected to the apex section by a second conical leg. The diaphragm has a plurality of ribs that engage the disc member when an annular lip is located on a shoulder of the cylindrical body. When inwardly Projecting tabs on the annular edge member of the disc engage corresponding arcuate projections extending from the cylindrical neck to fix the cap to the reservoir, the tapered peripheral surface on the flange of the cylindrical body engage the first conical leg to provide a radial force which urges the first conical leg into engagement with the cylindrical neck of the reservoir to form the Primary sealing for the reservoir while the plurality of ribs are compressed between the disc and top of the cylindrical neck to from the secondary sealing for the reservoir.

It is an object of this invention to provide a reservoir for master cylinder with a cap having primary and secondary sealing surfaces to reduce the possibility of fluid from being expelled from the reservoir due to thermal creep when the master cylinder is exposed to high thermal environmental conditions.

It is a further object of this invention to Provide a cap for a reservoir having a disc member with an edge rim and a plurality of center guides for aligning a cylindrical body with the edge rim. A diaphragm attached to the cylindrical body has a conical leg which is urged into engagement with the fill neck of the reservoir by a substantially radial force created between the cylindrical body and the neck when the disc is attached to the neck.

It is a still another object of this invention to provide a cap for a reservoir having a cylindrical member attached to a disc for urging a diaphragm into engagement with a fill neck of a reservoir wherein the cap, cylinder member and reservoir are made from material having the same coefficient of thermal expansion.

These objects and the advantages provided thereby should be apparent from reading this specification and viewing the drawings wherein:

FIG. 1 is a schematic illustration of a master cylinder having a reservoir attached thereto with a cap made according to the principles of this invention;

FIG. 2 is an enlarged view of the cap and fill neck of the reservoir of FIG. 1; and FIG. 3 is a top view of the fill neck of the reservoir with the cap removed therefrom.

The master cylinder 10 shown in FIG. 1 of the type disclosed in U.S. Pat. No. 4,685,300 which is connected to power assistbooster attached to the firewall of a vehicle. Outlet ports connect the master cylinder 10 to the individual wheel cylinders of a vehicle to provide pressurized fluid through which a brake application is effected. This type master cylinder 10 is often located under the hood of the vehicle where the temperature of the surrounding environment can often reach 180° F. Under such conditions, thermal expansion and contraction can introduce stress in the various components.

The master cylinder 10 shown in FIG. 1 has a reservoir 12 attached thereto in a manner as illustrated in U.S. Pat. No. 4,685,300 which has several compartments therein for storage of fluid for a brake system. The compartments are filled with fluid through a common cylindrical neck 14 which extends from the reservoir body 16, as best shown in FIG. 2. The cylindrical neck 14 has an annular face 18 with a plurality of arcuate projections 20, 20' . . . $20^N$ extending therefrom. Surface 27 on each of the arcuate projections 20, 20' . . . $20^N$ varies until reaching a flat surface 29 adjacent a stop 25. A detent 22 located on at least one projection 20, 20' . . . $20^N$ forms a restriction which resists or inhibits rotational movement of cap means 24 away from stop 25 after cap means 24 is attached to the cylindrical body 14 to seal the compartment from the surrounding environment.

The cap means 24 has a disc member 26 with an annular rim or edge 28 extending therefrom which covers the cylindrical body 14. The annular edge 28 has a Plurality of inwardly projecting tabs 30 (only one is shown) located a fixed distance from the disc member 26. The disc member 26 has a plurality of perpendicular guides 32 (only one is shown) located on a fixed radius from the center of the disc member 26. The guides 32 which are also substantially parallel with the annular edge or rim 28 has a cylindrical body 36 secured thereto. The cylindrical body 36 has an annular flange 34 with a tapered peripheral surface 38 extending from an edge 40 on a shoulder 42 located adjacent the annular flange 34.

Diaphragm means 44 has an annular base 46 with a first conical leg 48 connected to an apex section 50 and a center section 52 connected to the apex section 50 by a second conical leg 54. The first conical leg 48 has an annular lip 56 located substantially midway between the annular base 46 and the apex section 50. The annular base 46 has a Plurality of ribs 58, 60, and 62 that engage surface 64 on the disc member 26 when the annular lip 56 is located on shoulder 42 of the cylindrical body 36. As shown in the FIG. 2, the guides 32 have a recess 31 on the end thereof to aid in seating the annular lip 56 on the cylindrical body 36.

When cap means 24 is placed on neck section 14 of the reservoir 12 and provided with a rotary movement, the tapered peripheral surface 38 on flange 34 of the cylindrical body 36 engage the first conical leg 48 to provide a radial force which urges the first conical leg 48 into sealing engagement with the cylindrical neck 14 of the reservoir 12 when the inwardly projecting tabs 30 on the annular edge or rim 28 engage surface 27 on the arcuate projections 20, 20' ... 20-$^N$ extending from the cylindrical neck 14 to fix the cap means 24 to the reservoir 12.

Once the cap means 24 is attached to the cylindrical neck 14, the radial force from the tapered surface 38 on cylindrical body 36 holds the first conical leg 48 against surface 15 to form a first sealing surface to prevent fluid from being expelled from the various compartments in the master cylinder by way of the opening in the cylindrical body 14. The center section 52 of said diaphragm freely moves within said cylindrical body as a function of the fluid level in the chambers. Since the disc member 26 and cylindrical body 36 of the cap means 24 and cylindrical neck 14 of reservoir 12 are made from plastic material having substantially the same coefficient of thermal expansion, the sealing relationship between the first conical leg 48 of the diaphragm 44 and cylindrical neck 14 are substantially uneffected by the environmental temperature in which the master cylinder 10 is located.

As the fluid level in the compartment in the master cylinder 12 changes, the center section 52 pivots with respect to apex 50 and as the center section 52 is drawn into the cylindrical neck section 14, the sealing relationship of the first conical section 48 is maintained to prevent fluid from being expelled from the reservoir 12.

We claim:

1. In a master cylinder having a reservoir with a cylindrical neck for filing various chambers therein with fluid and cap means rotatably attached to the cylindrical neck to prevent fluid from being expelled from said chambers through said cylindrical neck, the improvement in the cap means comprising:
   a disc member having an annular edge extending therefrom, said annular edge having a plurality of inwardly projecting tabs located a fixed distance from said disc member, said disc member having a plurality of perpendicular guides located on a fixed radius from the center of the disc member, said guides being substantially parallel with said annular edge;
   a cylindrical body secured to said guides, said cylindrical body having an annular flange with a tapered peripheral surface extending from an edge of a shoulder formed adjacent said annular flange; and
   diaphragm means having an annular base with a first conical leg connected to an apex section and a center section connected to said apex section by a second conical leg, said first conical leg having an annular lip located substantially midway between said annular base and said apex section, said annular base having a plurality of ribs that engage said disc member when said annular lip is located on said shoulder of said cylindrical body, said guides have a recess to receive said annular lip to aid in holding said diaphragm means on said disc member, said tapered peripheral surface on said flange of said cylindrical member engaging said first conical leg to provide a radial force for urging said first conical leg into engagement with the cylindrical neck of the reservoir to define a primary seal when said inwardly projecting tabs on said annular edge engage corresponding arcuate projections extending from said cylindrical neck to fix the cap means to the reservoir, one of said arcuate projections extending from said cylindrical neck having a detent for engaging said inwardly projecting tabs of said disc member to inhibit rotation of said cap means with respect to the cylindrical neck.

2. The cap means for a reservoir of a master cylinder as recited in claim 1 wherein center section of said diaphragm means freely moves within said cylindrical body as a function of the fluid in the chambers.

3. The cap means for a reservoir of a master cylinder as recited in claim 2 wherein said primary force is substantially uneffected by thermal changes in the environment in which the master cylinder is located.

4. The cap means for a reservoir of a master cylinder as recited in claim 3 wherein said second conical leg allows said center section to pivot with respect to said apex.

5. The cap means for a reservoir of a master cylinder as recited in claim 4 wherein said disc member, cylindrical body and cylindrical neck are made from the same material to minimize the effect of thermal expansion of the sealing relationship between the first conical leg of the diaphragm and cylindrical neck.

6. The cap means for a reservoir of a master cylinder as recited in claim 5 wherein said engagement of said plurality of ribs with said disc member form a secondary seal to further prevent fluid from being expelled from said chambers.

7. The cap means for a reservoir of a master cylinder as recited in claim 6 wherein said primary seal is not effected by axial movement of the cylindrical body with respect to the cylindrical neck resulting from thermal changes.

* * * * *